UNITED STATES PATENT OFFICE.

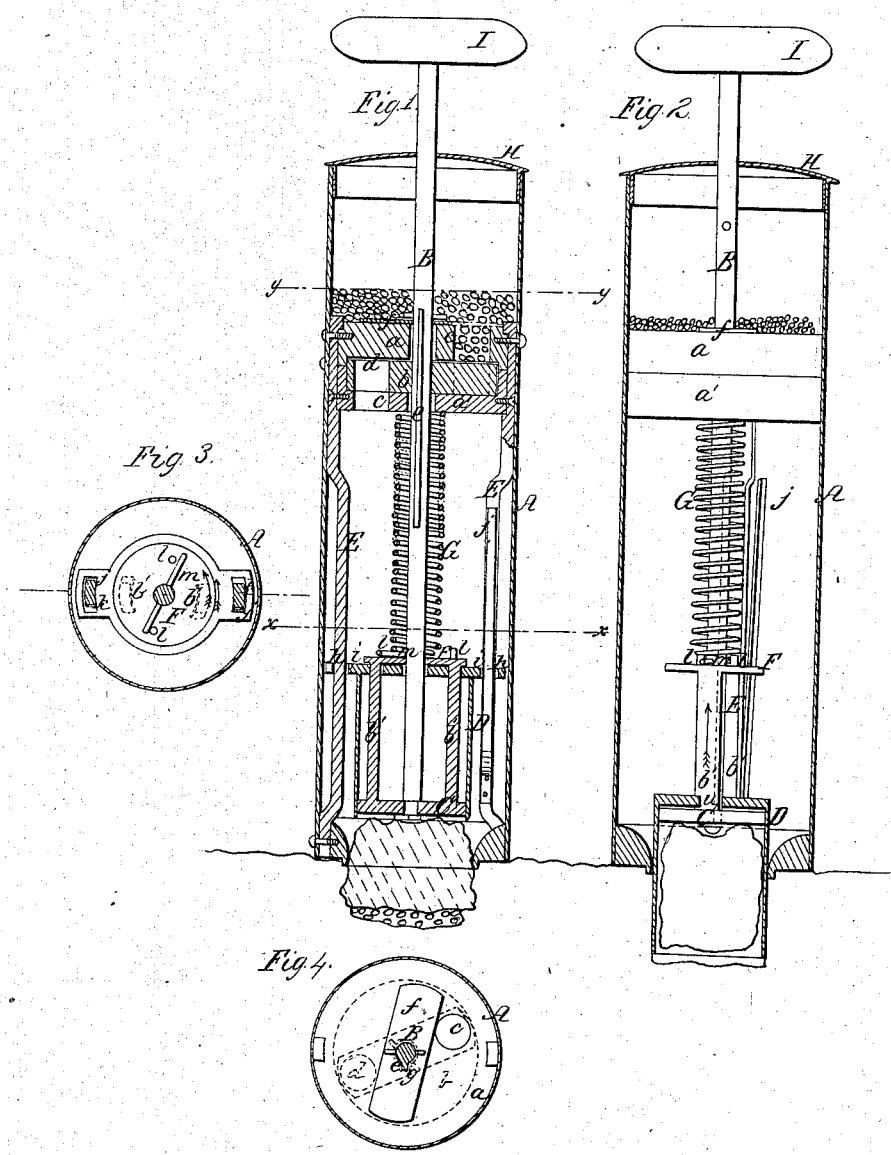

ANDREW J. BARNHART, OF SCHOOLCRAFT, MICHIGAN.

IMPROVEMENT IN SEED-PLANTERS.

Specification forming part of Letters Patent No. 12,465, dated February 27, 1855.

*To all whom it may concern:*

Be it known that I, ANDREW J. BARNHART, of Schoolcraft, in the county of Kalamazoo and State of Michigan, have invented a new and Improved Corn-Planter; and I do hereby declare that the following is a full, clear, and exact description of the same, reference being had to the annexed drawings, making a part of this specification, in which—

Figure 1 is a vertical section of my improved corn-planter, the plane of section being through the center. Fig. 2 is the same view as Fig. 1, but showing a different position of the parts. Fig. 3 is a horizontal section of the same, $xx$, Fig. 1, showing the plane of section. Fig. 4 is also a horizontal section of the same, $yy$, Fig. 1, showing the plane of section.

Similar letters of reference indicate corresponding parts in the several figures.

This invention relates to a new and improved hand implement for planting corn; and it consists in the combination of the several parts of the implement, as will be hereinafter fully shown and described, whereby the necessary hole is made in the ground to receive the corn and the corn dropped therein and covered with earth, the whole operation of planting being accomplished by a simple operation of the implement.

To enable others skilled in the art to make and use my invention, I will proceed to describe its construction and operation.

A represents a cylinder, which may be constructed of sheet-metal, and having permanently secured within it two disks or plates, $a\ a'$, between which a loose disk, $b$, is placed. (See Fig. 1.) The disks $a\ a'$ have each a vertical aperture, $c$, made through them near their edges, at opposite sides of their centers. The lower disk, $b$, also has a vertical aperture, $d$, made through it.

B is a rod, which passes through the centers of the disks $a, a,'$ and $b$, said rod having a feather, $e$, upon it, which feather fits in a groove near the center of the disk $b$, so that by turning the rod B the loose disk $b$ will turn with it; but the rod may be moved up and down without moving the loose disk. On the rod B, above the disk $a$, there is a plate, $f$, through which the rod passes, the feather $e$ fitting in the groove $g$ in the plate, causing the plate to turn with the rod. (See Fig. 4.)

To the lower end of the rod B there is attached a piston, C, which works within a cylinder, D, constructed of metal, and having eyes or apertures $h\ h$ in projections $i\ i$ on its upper part, through which eyes or apertures guide-rods E E, attached to the inner surface of the cylinder A, pass. The guide-rods have springs $jj$ attached to them, one to each, and they have recesses $k$ in them, one in each, as shown by dotted lines in Fig. 3, in which recesses the edges of the eyes or apertures $h\ h$ catch when the cylinder D is raised.

F is a circular plate, attached to the piston C by rods $b'\ b'$, the rods being equal in length to the cylinder D, the rods $b'\ b'$ passing through the head or top of the cylinder D. On the upper surface of this plate two small vertical pins, $l\ l$, are attached, against which a small rod, $m$, which passes through the rod B, acts.

G is a spiral spring, placed around the rod B and between the plate F and disk $a'$, as shown in Figs. 1 and 2.

H is a cover or top of the cylinder A, and I is the handle of the rod B.

Operation: The corn to be planted is placed in the upper part of the cylinder A, above the disk $a$, and the lower end of the cylinder A being placed over the desired spots, the rod B is first drawn upward and then turned from right to left in order to bring the plate $f$ over the aperture $c$ in the disk $a$. This plate cuts off all communication between the aperture $c$ in the disk $a$ and the space above it, which is, in fact, the hopper containing the corn, the aperture $c$ in the upper disk being filled with corn before being cut off by the plate $f$, and as the plate $f$ is turned the loose disk $b$ is also turned and its aperture $d$ brought under the aperture $c$ in the disk $a$. When the rod is turned from right to left the small rod $m$, which passes through the rod B, acts against the pins $l\ l$ on the plate F, and the edges of the eyes or apertures $h\ h$ in the projections $i\ i$ at the upper end of the cylinder are in consequence forced out from the recesses $k$, and the rod B is pressed downward, and the cylinder D is forced into the ground and then withdrawn by drawing up the rod B, the cylinder D being filled with earth and a hole formed in the ground. When the cylinder is withdrawn the edges of the eyes or apertures $h\ h$ catch into the recesses $k$, being forced in by the springs $jj$, and hold the cylinder D properly in place. The rod B is now turned from left to right, and the aperture $d$ in the loose disk $b$ is brought over the aperture $c$ of the lower disk $a'$, and the corn in the aperture $d$ falls through the aperture $c$ in the disk $a'$ and passes down around the cylinder D into the hole made in the earth by the cylinder D when it was pressed into the earth. The rod $b$ is now forced down, the spring G assisting, and the piston C forces the earth out of the cylinder D into the hole in the earth and covers the corn which was dropped therein.

Fig. 1 shows the position of the parts when the corn is covered, and Fig. 2 shows the parts when the cylinder D is forced down.

The rods $b'$ $b'$ have recesses $u$ $u$ at their lower end. One is shown in Fig. 2, which, when the plate is first turned from right to left, catches over the edges of the slots in the head of the cylinder D, through which slots the rods $b$ $b$ pass and allow the cylinder to be forced down by pressing down the rod B, and when the rod is turned from left to right the recesses $u$ $u$ are freed from the edges of the slots and allow the piston to be forced down.

By this simple invention the whole operation of planting may be performed—viz., the necessary holes made to receive the corn, the corn dropped in them, and then covered with earth, the implement being grasped with one hand and the rod B operated with the other, the lower end of the implement being placed over the spots where the corn is to be planted.

Having thus described my invention, what I claim as new, and desire to secure by Letters Patent, is—

The combination of the disks $a$ $a'$ $b$, movable cylinder D, and piston C, the above parts being inclosed or working within a cylinder or case A, and arranged substantially as shown, and for the purpose as set forth.

ANDREW J. BARNHART.

Witnesses:
ALEXANDER BUELL,
OLIVER DAVENPORT.